US011477715B2

(12) United States Patent
Liu et al.

(10) Patent No.: US 11,477,715 B2
(45) Date of Patent: Oct. 18, 2022

(54) METHOD AND DEVICE FOR DATA TRANSMISSION

(71) Applicant: ZTE CORPORATION, Shenzhen (CN)

(72) Inventors: Zhuang Liu, Shenzhen (CN); Yang Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 11 days.

(21) Appl. No.: 16/764,358

(22) PCT Filed: Oct. 19, 2018

(86) PCT No.: PCT/CN2018/111012
§ 371 (c)(1),
(2) Date: May 14, 2020

(87) PCT Pub. No.: WO2019/095930
PCT Pub. Date: May 23, 2019

(65) Prior Publication Data
US 2020/0280898 A1 Sep. 3, 2020

(30) Foreign Application Priority Data

Nov. 17, 2017 (CN) .......................... 201711148233.6

(51) Int. Cl.
*H04W 36/30* (2009.01)
*H04W 76/30* (2018.01)
(Continued)

(52) U.S. Cl.
CPC ........... *H04W 36/30* (2013.01); *H04W 28/12* (2013.01); *H04W 36/08* (2013.01); *H04W 76/30* (2018.02)

(58) Field of Classification Search
CPC ..... H04W 36/30; H04W 76/30; H04W 28/12; H04W 36/08; H04W 28/0236;
(Continued)

(56) References Cited

U.S. PATENT DOCUMENTS

2017/0207884 A1   7/2017 Jiang et al.
2017/0325281 A1   11/2017 Hong et al.
(Continued)

FOREIGN PATENT DOCUMENTS

CN   103716869 A      4/2014
CN   105813213 A  *   7/2016
(Continued)

OTHER PUBLICATIONS

Ericsson, CMCC ("Description of solutions for centralised retransmission with Option 2", 3GPP TSG-RAN WG3 Meeting #95bis, R3-171169, Apr. 3-7, 2017) (Year: 2017).*
(Continued)

*Primary Examiner* — Chi H Pham
*Assistant Examiner* — Ji-Hae Yea
(74) *Attorney, Agent, or Firm* — Morgan, Lewis & Bockius LLP

(57) ABSTRACT

Provided are a data transmission method and apparatus. The method includes: detecting, by a source base station, that link quality of a connection with a terminal degrades; sending data unsuccessfully transmitted by a DU via a downlink data frame to a target base station through a CU, and transmitting the data unsuccessfully transmitted to the terminal through the target base station; or receiving, by the target base station, a link quality degradation message of an original base station so as to stop sending offload data to the source base station and transmitting the data unsuccessfully transmitted indicated by a maximum serial number of the
(Continued)

data which has been transmitted continuously and successfully in the message to the terminal.

10 Claims, 6 Drawing Sheets

(51) Int. Cl.
*H04W 28/12* (2009.01)
*H04W 36/08* (2009.01)

(58) Field of Classification Search
CPC ..... H04W 28/02; H04W 72/12; H04W 76/15; H04W 88/08; H04W 88/085; H04W 92/20
See application file for complete search history.

(56) References Cited

U.S. PATENT DOCUMENTS

2020/0022046 A1* 1/2020 Wang .................... H04W 36/08
2020/0228260 A1* 7/2020 Jonsson ................. H04L 1/1896

FOREIGN PATENT DOCUMENTS

| | | |
|---|---|---|
| CN | 106550490 A | 3/2017 |
| CN | 106921996 A | 7/2017 |
| CN | 107027153 A | 8/2017 |
| CN | 107241754 A | 10/2017 |
| JP | 2006217219 A | 8/2006 |
| JP | 2020519203 A | 6/2020 |
| WO | WO-2014049971 A1 | 3/2014 |
| WO | WO-2017010062 A1 | 9/2017 |

OTHER PUBLICATIONS

Huawei ("Fast retransmission of lost PDUs", 3GPP TSG-RAN WG3 Meeting #97, R3-173114, Aug. 21-25, 2017 (Year: 2017).*
U.S. Appl. No. 62/525,032 (Year: 2017).*
International Search Report for Application No. PCT/CN2018/111012, dated Jan. 12, 2019, 4 pages.
3GPP, 3rd Generation Partnership Project; Technical Specification Group Radio Access Network; NG-RAN; Architecture description (Release 15), 3GPP TS 38.401 V0.4.1, Oct. 2017, Internet<URL:http://www.3gpp.org/ftp//Specs/archive/38_series/38.401/38401-041.zip>, Nov. 10, 2017.
Chinese Office Action for Application No. 201711148233.6, dated May 6, 2021, 10 pages including translation.
Ericsson et al., "Fast centralized retransmission of lost PDUs[online]", 3GPP TSG-RAN WG3 #96, R3-171728, Hangzhou, China, May 15-19, 2017, Internet<URL:http://www.3gpp.org/ftp/tsg_ran/WG3_lu/TSGR3_96/Docs/R3-171728.zip>, May 19, 2017.
Huawei, "Fast retransmission of lost PDUs" [online], 3GPP TSG RAN WG3 #97 R3 / 173114, Berlin, Germany, Aug. 21-25, 2017, Internet<URL:http://www.3gpp.org/ftp/tsg_ran/WG3_lu/TSGR3_97/Docs/R3-173114.zip>, Aug. 25, 2017.
Japanese Office Action for Application No. 2029521357, dated Jun. 23, 2021, 11 pages including translation.
Ericsson et al., "Intra-gNB-CU mobility procedures", 3GPP Draft; R3-173967 Intra GNB-CU Mobility Procedures, 3rd Generation Partnership Project (3GPP), Mobile Competence Centre; 650, Route Des Lucioles; F-06921 Sophia-Antipolis Cedex; France, vol. RAN WG3, No. Prague; Sep. 1, 2017 Sep. 29, 2017 (Sep. 29, 2107), XP051356461, Retrieved from the Internet: URL:http://www.3gpp.org/ftp/tsg_ran/WG3_lu/TSGR3_97bis/Docs/[retrieved on Sep. 29, 2017] * Section 1 Section 2*.
Extended European Search Report for Application No. 18879455.6, dated Aug. 30, 2021, 12 pages.
Huawei et al, "Purpose and need to have mobility assistance information", 3GPP Draft; R2-123810 Purpose and Need To Have Mobility Assistance Information, 3rd Generation Partnership Project (3GPP), Mobile Competence Centre; 650, Route Des Lucioles; F-06921 Sophia-Antipolis, vol. RAN WG2, No. Qingdao, China; Aug. 13, 2012-Aug. 17, 2012 Aug. 7, 2012 (Aug. 7, 2012), XP050665713, Retrieved from the Internet: URL:http://www.3gpp.org/ftp/tsg_ran/WG2_RL2/TSGR2_79/Docs/[retreived on Aug. 7, 2012] * Section 2.1 Minimizing RRC signaling *.
Korean Office Action for Application No. 1020207013545, dated Aug. 24, 2021, 6 pages including translation.
Chinese Office Action for Application No. 201711148233.6, dated Mar. 3, 2022, 14 pages including translation.
Chinese Supplemental Search Report for Application No. 201711148233.6, dated Feb. 24, 2022, 3 pages including translation.
Japanese Office Action for Application No. 2029521357, dated Feb. 22, 2022, 7 pages including translation.

* cited by examiner

| Bits | | | | | | | | Number of Octets |
|---|---|---|---|---|---|---|---|---|
| 7 | 6 | 5 | 4 | 3 | 2 | 1 | 0 | |
| Data packet type | | | | Spare | | | | 1 |
| Interface data packet serial number | | | | | | | | 3 |
| Retransmission data indication (retransmission data if IE exists, and not retransmission data if IE does not exits; or retransmission date if IE has a value of TRUE, and not retransmission data if IE has a value of FALSE) | | | | | | | | 4 |
| Spare extension | | | | | | | | 0-4 |

METHOD AND DEVICE FOR DATA TRANSMISSION

CROSS REFERENCE TO RELATED APPLICATIONS

This is a National Stage Application, filed under 35 U.S.C. 371, of International Patent Application No. PCT/CN2018/111012, filed on Oct. 19, 2018, which claims priority to Chinese patent application No. 201711148233.6 filed on Nov. 17, 2017, contents of both of which are incorporated herein by reference in their entireties.

TECHNICAL FIELD

The present disclosure relates to the field of communications and, particularly, to a data transmission method and apparatus.

BACKGROUND

Architecture of a 5G network is innovative and flexible in networking. In the 5G network, a base station on a radio access network side is separated into two functional entities, a centralized unit (CU) and a distributed unit (DU), and one base station includes one CU and at least one DU. In a CU-DU separated network architecture, a delay-insensitive network function is placed in the CU, and a delay-sensitive network function is placed in the DU. The CU and the DU perform transmission and connection through an ideal or non-ideal fronthaul.

FIG. 1 is a schematic diagram of a connection of multiple DUs under one base station and a terminal in the related art, and as shown in FIG. 1, in order to provide a higher rate to a user, the existing wireless networking technology supports the connection of multiple DUs under one base station and a terminal, and the terminal may simultaneously send and receive data from two or more DUs.

In the existing CU/DU separated architecture, for a CU/DU higher layer separation, PDCP and layers above PDCP are placed in the CU, and RLC and layers below RLC are placed in the DU. When the terminal is connected to the multiple DUs under one base station, a base station CU entity may offload downlink PDCP PDU data to two or more DUs for transmission to the terminal. During data transmission, if a DU has a terminal traffic connection "outage" (outage is defined herein as short-term link quality degradation), in order to reduce data transmission delay and packet loss, the DU needs to send an outage message to the CU, where the outage message carries a maximum PDCP serial number successfully and continuously sent by the DU. The CU receives the outage message of the DU. The CU may determine which PDCP PDUs sent to the DU are not successfully sent by the DU according to the maximum PDCP SN serial number carried by the outage message, and the CU may send the part of PDCP PDU data, which is not successfully sent, to another DU for transmission to the terminal, thereby reducing data sending time delay and packet loss. When link quality of a DU having an "outage" resumes, the DU may send a "RESUME" message of a terminal traffic connection to the CU to notify the CU that the link quality of the terminal connection has resumed, so that the CU may resume to send traffic bearer data of the terminal to the DU for transmission. However, in the related art, the CU sends data unsuccessfully transmitted by a source DU to a target DU for retransmission, but the target DU may not identify whether the data is retransmitted data or newly transmitted data, and arranges the data at the end of a sending queue, thereby resulting in an increase in data transmission delay.

In addition, a base station dual connectivity technology is also supported in the existing wireless communication technology, a user may maintain a connection to two or more base stations, and traffic bearer data of a terminal may be offloaded to the two or more base stations for transmission. FIG. 2 is a schematic diagram of base station dual connectivity in the related art. As shown in FIG. 2, an anchor base station refers to a base station connected to a core network, and the anchor base station is used for receiving traffic bearer data of a terminal sent by the core network. An offload base station refers to a base station which is connected to the anchor base station and is used for receiving traffic bearer data of a terminal offloaded by the anchor base station. A user terminal is connected to the anchor base station and the offload base station simultaneously.

When the base station dual connectivity technology is used and a base station uses a CU/DU separated structure, after a DU of the base station has short-term quality deterioration of a terminal traffic link, in the existing dual connectivity technology, data does not continue to be transmitted until terminal link quality of the DU of the base station resumes, and the data unsuccessfully transmitted on the DU of the base station cannot be sent to another base station for transmission when the DU of the base station has link quality deterioration of a connection to a terminal, thereby resulting in an increase in data transmission delay or even packet loss. Therefore, in the existing dual connectivity technology, when a base station uses the CU/DU separated structure, even if quality of a downlink data transmission link of a DU is deteriorated, a network side cannot actively take measures to perform relevant adjustments, thereby resulting in an increase in data transmission delay or even packet loss.

For the base station dual connectivity technology in the related art, when a base station uses the CU/DU separated structure, even if the quality of a downlink data transmission link of a DU is deteriorated, the network side cannot actively take measures to perform relevant adjustments, thereby resulting in an increase in data transmission delay or even packet loss.

SUMMARY

According to an embodiment of the present disclosure, a data transmission method is provided. The method includes steps described below.

A source base station detects, through a DU, link quality degradation of a connection to a terminal; the source base station determines, through a CU, data unsuccessfully transmitted by the DU, and sends the data unsuccessfully transmitted by the DU via a downlink data frame to a target base station through the CU, where the downlink data frame is used for the target base station to transmit the data unsuccessfully transmitted to the terminal; or the source base station sends a link quality degradation message of the source base station to the target base station, where the link quality degradation message carries a serial number of data successfully transmitted, and the link quality degradation message is used for the target base station to determine the data unsuccessfully transmitted by the DU according to the serial number, stop sending offload data to the source base station and transmit the data unsuccessfully transmitted by the DU to the terminal.

In an embodiment, the step in which the source base station sends the data unsuccessfully transmitted by the DU via the downlink data frame to the target base station through the CU includes a step described below.

The source base station sends the downlink data frame to the target base station through an interface between the source base station and the target base station, where the downlink data frame carries the data unsuccessfully transmitted by the DU.

In an embodiment, after the source base station sends the data unsuccessfully transmitted by the DU via the downlink data frame to the target base station through the CU, the method further includes a step described below.

The source base station stops sending data to the DU, sends data received from a core network to the target base station, and transmits the data to the terminal through the target base station.

In an embodiment, the step in which the source base station determines, through the CU, the data unsuccessfully transmitted by the DU includes steps described below.

The source base station sends a link quality degradation message to the CU through the DU, where the link quality degradation message carries a serial number of data successfully transmitted by the DU; and the source base station determines, through the CU, the data unsuccessfully transmitted by the DU according to the serial number.

In an embodiment, the method further includes steps described below.

The source base station detects through the DU that a link of the connection to the terminal has resumed to normal; the source base station sends, through the DU to the CU, a resume message that the link has resumed to normal; and the source base station resumes, through the CU, sending traffic bearer data of the terminal to the DU.

In an embodiment, after the source base station sends the link quality degradation message to the CU through the DU, the method further includes steps described below.

The source base station starts a timer through the CU, and in response to receiving the resume message from the DU before the timer times out, the timer is cleared; and in response to failing to receive the resume message from the DU until the timer times out, a traffic connection of the terminal is released.

In an embodiment, after the source base station sends the link quality degradation message of the source base station to the target base station, the method further includes steps described below.

The source base station detects through the DU that a link of the connection to the terminal has resumed to normal; the source base station sends, through the DU to the CU, a resume message that the link has resumed to normal; and the source base station sends the resume message to the target base station through the CU, where the resume message is used for the target base station to resume sending the offload data to the source base station.

In an embodiment, the downlink data frame carries a retransmission data indication, where the retransmission data indication is used for instructing the target base station to identify retransmission data and perform preferential processing.

According to another embodiment of the present disclosure, a data transmission method is further provided. The method includes steps described below.

A target base station receives data unsuccessfully transmitted by a DU which is sent by a source base station through a downlink data frame, where the downlink data frame is transmitted by the source base station through a CU, and the data unsuccessfully transmitted by the DU is determined through the CU in a case where the source base station detects, through the DU, link quality degradation of a connection to a terminal, and transmits the data unsuccessfully transmitted which is carried in the downlink data frame to the terminal; or the target base station receives a link quality degradation message of the source base station sent by the source base station, where the link quality degradation message carries a serial number of data successfully transmitted, determines the data unsuccessfully transmitted by the DU according to the serial number, stops sending offload data to the source base station and sends the data unsuccessfully transmitted by the DU to the terminal.

In an embodiment, the method further includes steps described below.

While or after the target base station transmits the data unsuccessfully transmitted to the terminal according to a retransmission data indication, the target base station receives data which is sent by a core network and forwarded by the source base station; and the target base station transmits the data to the terminal.

In an embodiment, the downlink date frame further carries a retransmission data indication, and after the target base station receives the data unsuccessfully transmitted by the DU which is sent by the source base station through the downlink data frame, the method further includes steps described below.

The target base station identifies the data as retransmission data through the retransmission data indication; and a transmission priority of the data is increased.

In an embodiment, after the data unsuccessfully transmitted by the DU is determined according to the serial number, the offload data to the source base station is stopped sending and the data unsuccessfully transmitted by the DU is sent to the terminal, the method further steps described below.

The target base station receives a resume message sent by the source base station through the CU, where the resume message is sent to the CU through the DU after the source base station detects through the DU that a link connection to the terminal has resumed to normal; and the target base station resumes sending the offload data to the source base station according to the resume message.

According to another embodiment of the present disclosure, a data transmission apparatus, applied to a source base station, is further provided. The apparatus includes a detection module, a first sending module and a second sending module.

The detection module is configured to detect, through a DU, link quality degradation of a connection to a terminal; the first sending module is configured to determine, through a CU, data unsuccessfully transmitted by the DU, and send the data unsuccessfully transmitted by the DU via a downlink data frame to a target base station through the CU, where the downlink data frame is used for the target base station to transmit the data unsuccessfully transmitted to the terminal; or the second sending module is configured to send a link quality degradation message of the source base station to the target base station, where the link quality degradation message carries a serial number of data successfully transmitted, and the link quality degradation message is used for the target base station to determine the data unsuccessfully transmitted by the DU according to the serial number, stop sending offload data to the source base station and transmit the data unsuccessfully transmitted by the DU to the terminal According to another embodiment of the present disclosure, a data transmission apparatus, which is applied to a target base station, is further provided. The apparatus includes a first receiving module and a second receiving module.

The first receiving module is configured to receive data unsuccessfully transmitted by a DU which is sent by a source base station through a downlink data frame, where the downlink data frame is transmitted by the source base station through a CU, and the data unsuccessfully transmitted by the DU is determined through the CU in a case where the source base station detects, through the DU, link quality degradation of a connection to a terminal through the DU, and transmit the data unsuccessfully transmitted which is carried in the downlink data frame to the terminal; or the second receiving module is configured to receive a link quality degradation message of the source base station sent by the source base station, where the link quality degradation message carries a serial number of data successfully transmitted, determine the data unsuccessfully transmitted by the DU according to the serial number, stop sending offload data to the source base station and send the data unsuccessfully transmitted by the DU to the terminal.

According to another embodiment of the present disclosure, a storage medium is further provided. The storage medium includes a stored program which, when executed, performs the method of any one of the embodiments described above.

According to another embodiment of the present disclosure, a processor is further provided. The processor is configured to execute a program, which, when executed, performs the method of any one of the embodiments described above.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. Among the drawings.

DETAILED DESCRIPTION

Hereinafter the present disclosure will be described in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Embodiment 1

Figure 1:
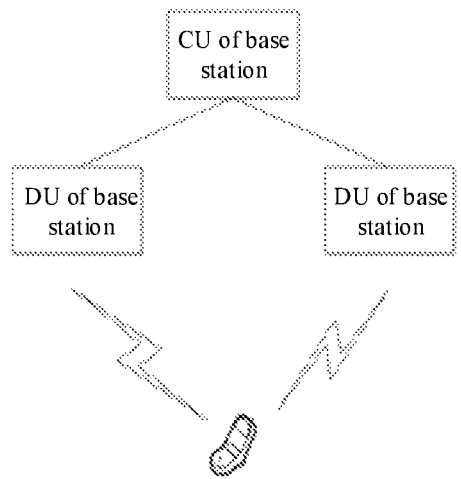
FIG. 1 is a schematic diagram of a connection of multiple DUs under one base station and a terminal in the related art.
Figure 2:
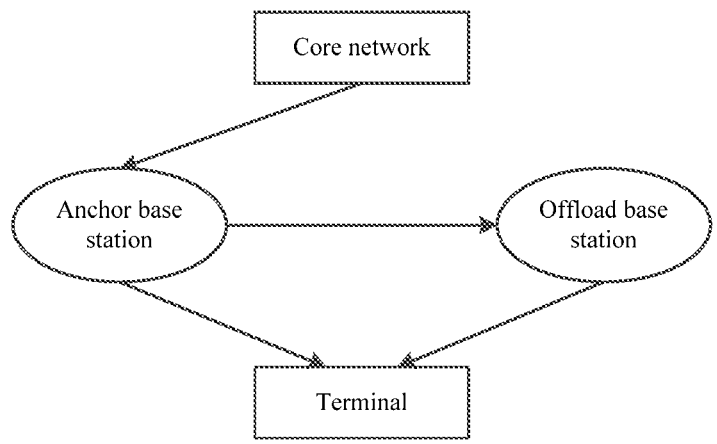
FIG. 2 is a schematic diagram of base station dual connectivity in the related art
Figure 3:
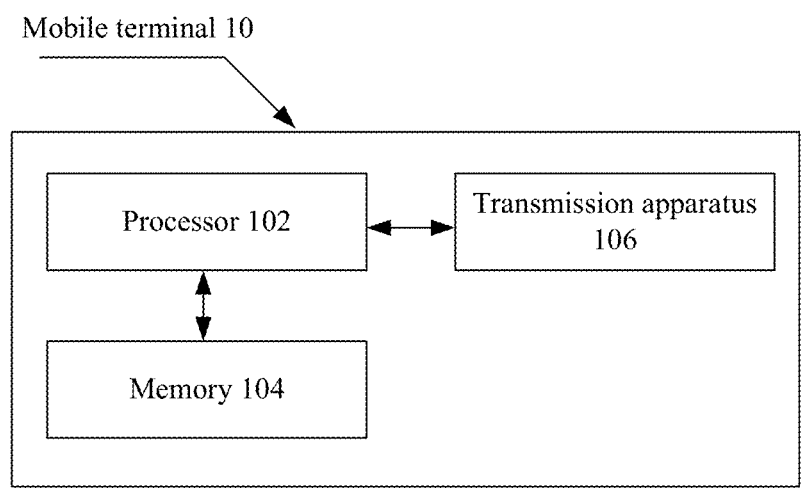
FIG. 3 is a block diagram of hardware of a mobile terminal of a data transmission method according to an embodiment of the present disclosure.

A method embodiment provided by the embodiment 1 of the present application may be executed in a mobile terminal, a computer terminal or other similar computing apparatuses. Taking the method embodiment to be executed in a mobile terminal as an example, FIG. 3 is a block diagram of hardware of a mobile terminal of a data transmission method according to an embodiment of the present disclosure, as shown in FIG. 3, a mobile terminal 10 may include one or two (only one is shown in FIG. 3) processors 102 (the processor 102 may include, but is not limited to, a processing device such as a microprocessor (MCU), a Field Programmable Gate Array (FPGA), or the like), a memory 104 used for storing data, and a transmission apparatus 106 used for implementing a communication function. It should be understood by those skilled in the art that the structure shown in FIG. 3 is merely illustrative and not intended to limit the structure of the electronic apparatus described above. For example, the mobile terminal 10 may further include more or fewer components than the components shown in FIG. 3 or may have a configuration different from the configuration shown in FIG. 3.

The memory 104 may be configured to store software programs and modules of application software, such as program instructions/modules corresponding to the data transmission method in the embodiments of the present disclosure. The one or more processors 102 execute the software programs and modules stored in the memory 104 to perform various functional applications and data processing, that is, to implement the method described above. The memory 104 may include a high-speed random access memory, and may further include a nonvolatile memory such as one or two magnetic storage devices, a flash memory or other nonvolatile solid-state memories. In some examples, the memory 104 may further include a memory that is remotely disposed with respect to the processor 102. The remote memory may be connected to the mobile terminal 10 via a network. Examples of the above network include, but are not limited to, the Internet, an intranet, a local area network, a mobile communication network and a combination thereof.

The transmission apparatus 106 is configured to receive or send data via a network. Specific examples of the above networks may include a radio network provided by a communication provider of the mobile terminal 10. In one example, the transmission apparatus 106 includes a network interface controller (NIC), which may be connected to another network device via a base station and thus be capable of communicating with the Internet. In one example, the transmission apparatus 106 may be a Radio Frequency (RF) module, which is used for communicating with the Internet in a wireless manner.

Figure 4:
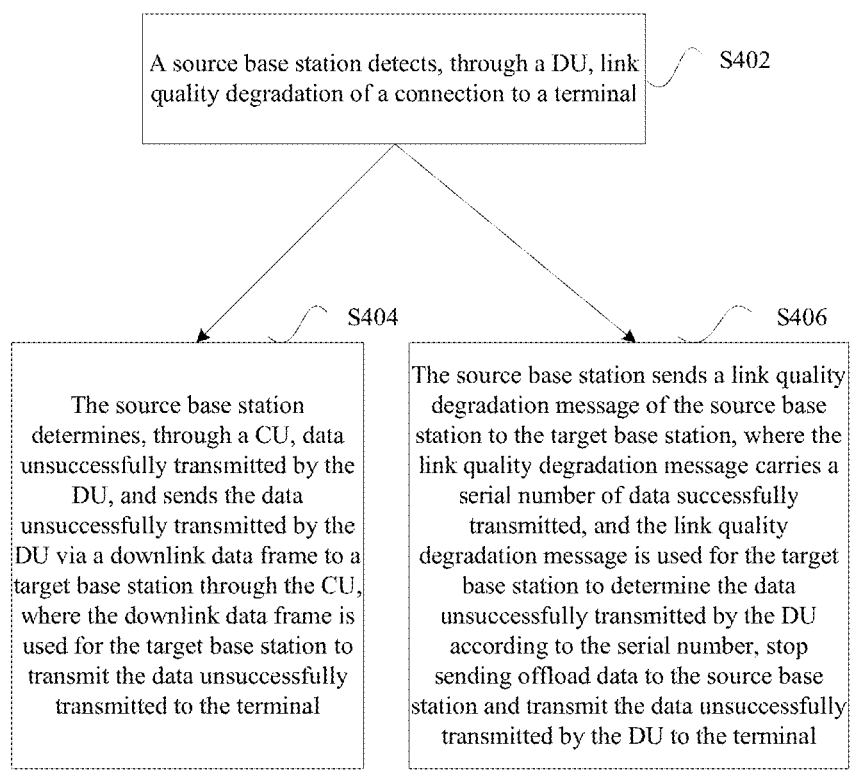
FIG. 4 is a flowchart 1 of a data transmission method according to an embodiment of the present disclosure.

Based on the mobile terminal described above, an embodiment of the present disclosure provides a data transmission method. FIG. 4 is a flowchart 1 of a data transmission method according to an embodiment of the present disclosure. As shown in FIG. 4, the method includes steps described below.

In step S402, a source base station detects, through a DU, link quality degradation of a connection to a terminal;

In step S404, the source base station determines, through a CU, data unsuccessfully transmitted by the DU, and sends the data unsuccessfully transmitted by the DU via a downlink data frame to a target base station through the CU, where the downlink data frame is used for the target base station to transmit the data unsuccessfully transmitted to the terminal; or In step S406, the source base station sends a link quality degradation message of the source base station to the target base station, where the link quality degradation message carries a serial number of data successfully transmitted, and the link quality degradation message is used for the target base station to determine the data unsuccessfully transmitted by the DU according to the serial number, stop sending offload data to the source base station and transmit the data unsuccessfully transmitted by the DU to the terminal.

For the base station dual connectivity technology in the related art, when a base station uses a CU/DU separated structure, even if quality of a DU downlink data transmission link is deteriorated, a network side cannot actively take measures to perform relevant adjustments, thereby resulting in an increase in data transmission delay or even packet loss. Through the above steps, by retransmitting data on a base station with good link quality, the data transmission delay is reduced, packet loss is reduced, and user experience is improved.

In an embodiment, the step in which the source base station sends the data unsuccessfully transmitted by the DU via the downlink data frame to the target base station through the CU includes a step described below. The source base station sends the downlink data frame to the target base station through an interface between the source base station and the target base station, where the downlink data frame carries the data unsuccessfully transmitted by the DU.

In an embodiment, after the source base station sends the data unsuccessfully transmitted by the DU via the downlink data frame to the target base station through the CU, the method further includes a step described below. The source base station stops sending data to the DU, sends data received from a core network to the target base station, and transmits the data to the terminal through the target base station.

In an embodiment, the step in which the source base station determines, through the CU, the data unsuccessfully transmitted by the DU includes steps described below. The source base station sends a link quality degradation message to the CU through the DU, where the link quality degradation message carries a serial number of data successfully transmitted by the DU; and the source base station determines, through the CU, the data unsuccessfully transmitted by the DU according to the serial number.

In an embodiment, the method further includes steps described below. The source base station detects through the DU that a link of the connection to the terminal has resumed to normal; the source base station sends, through the DU to the CU, a resume message that the link has resumed to normal; and the source base station resumes, through the CU, sending traffic bearer data of the terminal to the DU.

In an embodiment, after the source base station sends the link quality degradation message to the CU through the DU, the method further includes steps described below. the source base station starts a timer through the CU, and in response to receiving the resume message from the DU before the timer times out, the timer is cleared; and in response to failing to receive the resume message from the DU until the timer times out, a traffic connection of the terminal is released.

In an embodiment, after the source base station sends the link quality degradation message of the source base station to the target base station, the method further includes steps described below. The source base station detects through the DU that a link of the connection to the terminal has resumed to normal; the source base station sends, through the DU to the CU, a resume message that the link has resumed to normal; and the source base station sends the resume message to the target base station through the CU, where the resume message is used for the target base station to resume sending the offload data to the source base station.

In an embodiment, the downlink data frame carries a retransmission data indication, where the retransmission data indication is used for instructing the target base station to identify retransmission data and perform preferential processing.

Embodiment 2

Figures 5, 6:
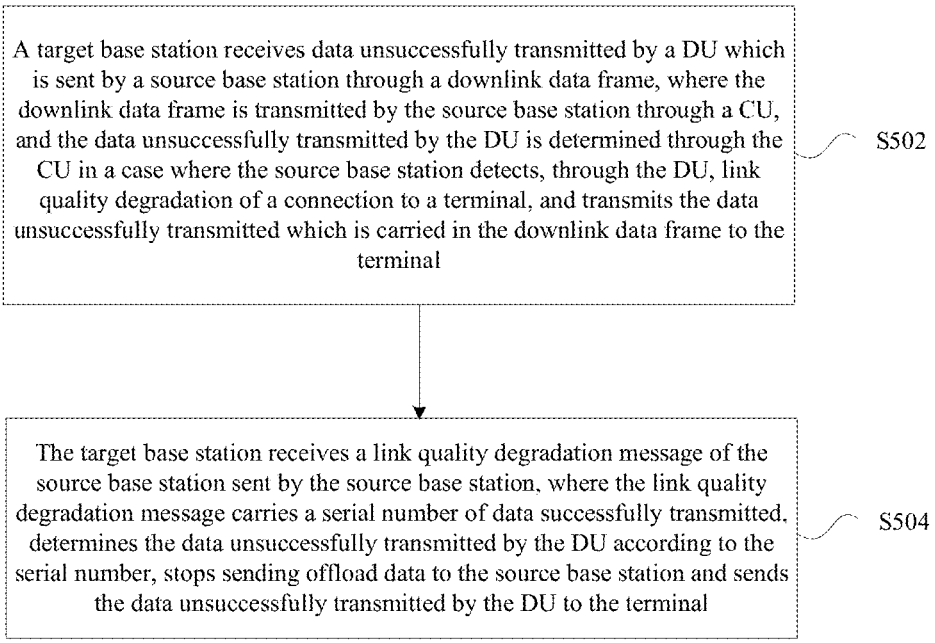
FIG. 5 is a flowchart 2 of a data transmission method according to an embodiment of the present disclosure.
FIG. 6 is a schematic diagram of a definition of a downlink data frame for transmitting user plane data between network elements according to an embodiment of the present disclosure.

An embodiment of the present disclosure further provides a data transmission method. FIG. 5 is a flowchart 2 of a data transmission method according to an embodiment of the present disclosure. As shown in FIG. 5, the method includes steps described below.

In step S502, a target base station receives data unsuccessfully transmitted by a DU which is sent by a source base station through a downlink data frame, where the downlink data frame is transmitted by the source base station through a CU, and the data unsuccessfully transmitted by the DU is determined through the CU in a case where the source base station detects, through the DU, link quality degradation of a connection to a terminal, and transmits the data unsuccessfully transmitted which is carried in the downlink data frame to the terminal; or In step S504, the target base station receives a link quality degradation message of the source base station sent by the source base station, where the link quality degradation message carries a serial number of data successfully transmitted, determines the data unsuccessfully transmitted by the DU according to the serial number, stops sending offload data to the source base station and sends the data unsuccessfully transmitted by the DU to the terminal.

In an embodiment, the method further includes steps described below. While or after the target base station transmits the data unsuccessfully transmitted to the terminal according to a retransmission data indication, the target base station receives data which is sent by a core network and forwarded by the source base station; and the target base station transmits the data to the terminal.

In an embodiment, the downlink date frame further carries a retransmission data indication, and after the target base station receives the data unsuccessfully transmitted by the DU which is sent by the source base station through the downlink data frame, the method further includes steps described below. The target base station identifies the data as retransmission data through the retransmission data indication, a transmission priority of the data is increased and the retransmission data is sent preferentially.

In an embodiment, after the data unsuccessfully transmitted by the DU is determined according to the serial number, the offload data to the source base station is stopped sending and the data unsuccessfully transmitted by the DU is sent to the terminal, the method further steps described below. The target base station receives a resume message sent by the source base station through the CU, where the resume message is sent to the CU through the DU after the source base station detects through the DU that a link connection to the terminal has resumed to normal; and the target base station resumes sending the offload data to the source base station according to the resume message.

In the embodiment of the present disclosure, a "retransmission data indication" field is added in a definition of a downlink data frame for transmitting user plane data between network elements, and may be applied to an interface (F1 interface) between a CU and a DU inside a base station and an interface (X2 or XN interface) between base stations. If the field exists in the downlink data frame, the data is retransmission data, and if the field does not exist, the data is non-retransmission data; or if a value of the field is TRUE, the data is the retransmission data and if the value of the field is FALSE, the data is the non-retransmission data.

When the definition of the downlink data frame is applied to the interface between a CU and a DU, The CU sends data unsuccessfully transmitted data by one DU to a target DU for transmission through the downlink data frame. When the target DU identifies, through the "retransmission data indication" field in the downlink data frame, that the data is the retransmission data, a sending priority of the data is increased, and the data is sent preferentially.

When the definition of the downlink data frame is applied to the interface between base stations, a source base station sends data unsuccessfully transmitted data by the source base station to the target base station for transmission through the downlink data frame. When the target base station identifies, through the "retransmission data indication" field in the downlink data frame, that the data is the retransmission data, the sending priority of the data is increased, and the data is sent preferentially.

After a CU node of an anchor base station receives an outage message of a terminal traffic connection reported by a DU of the anchor base station, the CU determines which PDCP PDUs are not successfully transmitted in the DU through, "maximum packet data convergence protocol (PDCP) serial number (SN) submitted continuously and successfully" IE, in the outage message, sends part of PDCP PDUs to an offload base station for transmission through the downlink data frame between base stations, indicates that the data is retransmission data in the "retransmission data indication" of the downlink data frame, stops sending data to the DU of the anchor base station, and sends subsequent terminal traffic bearer data received from the core network to the offload base station for transmission. When the offload base station receives the downlink data frame forwarded by the anchor base station, if the offload base station identifies, through the 'retransmission data indication' field in the downlink data frame, that the data is the retransmission data, the sending priority of the data is increased, and the data is sent preferentially. After the CU node of the anchor base station receives a resume message of the terminal traffic connection reported by the DU of the anchor base station, the anchor base station resumes sending terminal traffic bearer data to the DU of the anchor base station. In an embodiment, after receiving the outage message of a terminal connection, the CU of the anchor base station may start a timer, and in response to receiving a resume message of the terminal connection from the DU before the timer times out, the CU stops the timer. In response to failing to receive the resume message of the terminal connection reported by the DU until the timer times out, the CU may initiate a terminal RRC connection release process to release a traffic connection of the terminal.

After the CU node of the offload base station receives the outage message of the terminal traffic connection reported by the DU of the offload base station, If the interface between base stations may directly identify the outage message, the offload base station directly forwards the outage message to the anchor base station, otherwise the offload base station CU constructs the outage message sent to the anchor base station, and the offload base station CU parses, "maximum PDCP SN submitted continuously and successfully" IE, in the received outage message from the DU, and a value of IE is filled in IE, "maximum PDCP SN submitted continuously and successfully", in the constructed outage message sent to the anchor base station. The offload base station sends the outage message to the anchor base station. After the CU node of the offload base station receives the resume message of the terminal traffic connection reported by the DU of the offload base station DU, if the interface between base stations may directly identify the resume message, the offload base station directly forwards the resume message to the anchor base station, otherwise the offload base station CU constructs the resume message sent to the anchor base station, where the resume message is used for notifying the anchor base station that the offload base station terminal traffic transmission link quality has resumed.

After the anchor base station receives the outage message of the terminal traffic connection sent by the offload base station, the anchor base station determines, through "maximum PDCP SN submitted continuously and successfully" IE in the outage message, which PDCP PDUs on the offload base station have not been successfully transmitted, sends this part of PDCP PDUs to the terminal on the anchor base station; and the anchor base station stops sending the terminal traffic bearer data to the offload base station. After the anchor base station receives resume message of the terminal traffic connection reported by the offload base station, the anchor base station resumes sending the terminal traffic bearer data to the offload base station. In an embodiment, after receiving the terminal traffic connection outage message by the offload base station, the anchor base station may start a timer, and in response to receiving the resume message of the terminal traffic connection of the offload base station before the timer times out, the anchor base station stops the timer. After the timer times out, in response to failing to receiving the resume message of the terminal traffic connection reported by the offload base station, the anchor base station may initiate a bearer type modification process to modify traffic bearer offloaded to the offload base station to a bearer type of being transmitted separately by the anchor base station, or the anchor base station may initiate an offload base station node release process.

When the base station dual connectivity technology is used and one base stations uses the CU/DU separated structure, after a terminal traffic connection outage occurs in the DU of the base station, in the existing dual connectivity technology, data does not continues to be transmitted until traffic link quality of the DU of the base station resumes, thereby resulting in an increase in data transmission delay or even packet loss. After the technology of the present disclosure is used, the network side can retransmit data on a base station with good link quality, thereby reducing data transmission delay and reducing packet loss. By defining the "retransmission data indication" field in the downlink data frame between network elements to identify whether the data is retransmission data, thereby increasing the sending priority of the data and reducing data sending delay.

The present disclosure will be described below in conjunction with the drawings and embodiments.

Example 1

FIG. 6 is a schematic diagram of a definition of a downlink data frame for transmitting user plane data between network elements according to an embodiment of the present disclosure. As shown in FIG. 6, the definition may be applied to an interface (F1 interface) between a CU and a DU inside a base station and an interface (X2 or XN interface) between base stations. The downlink data frame includes the "retransmission data indication" field provided by the present disclosure, and other fields of the downlink data frame are not indicated in the schematic diagram. If the field exists, the data is retransmission data, and if the field does not exist, the data is non-retransmission data; or if a value of the field is TRUE, the data is retransmission data and if the value of the field is FALSE, the data is non-retransmission data.

When the definition of the downlink data frame is applied to the interface between the CU and the DU, The CU sends data unsuccessfully transmitted data by one DU to a target DU for transmission via the downlink data frame. When the target DU identifies, through the "retransmission data indication" field in the downlink data frame, that the data is the retransmission data, a sending priority of the data is increased, and the data is sent preferentially.

When the definition of the downlink data frame is applied to the interface between base stations, a source base station sends data unsuccessfully transmitted data by the source base station to the target base station for transmission through the downlink data frame. When the target base station identifies, through the "retransmission data indication" field in the downlink data frame, that the data is the retransmission data, the sending priority of the data is increased, and the data is sent preferentially.

Example 2

Figure 7:
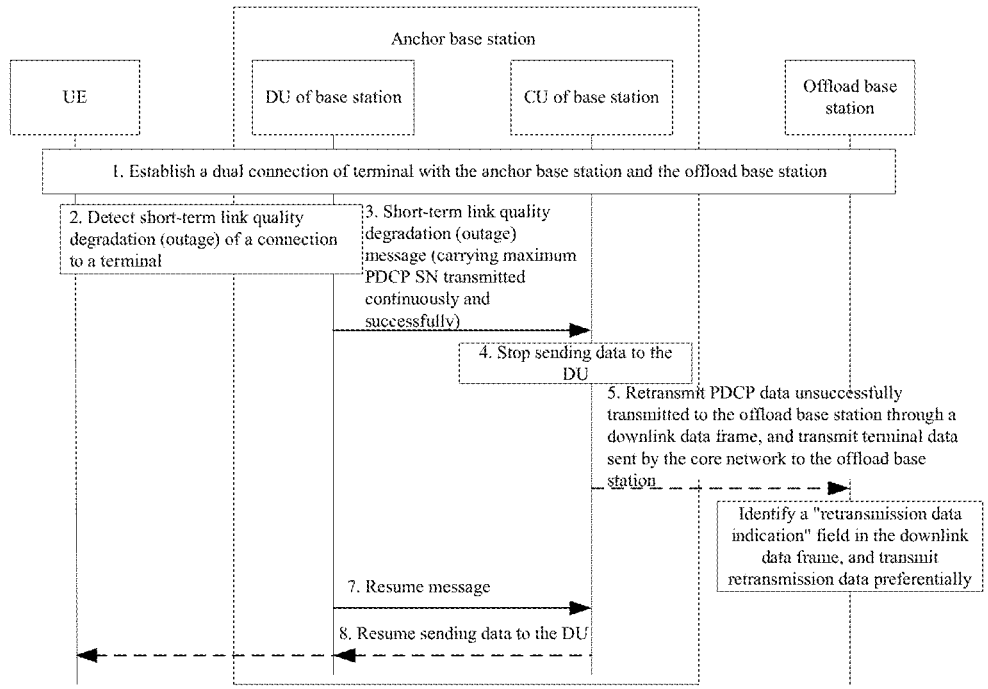
FIG. 7 is a flowchart of processing after an outage occurs in a DU of an anchor base station according to an embodiment of the present disclosure.

FIG. 7 is a flowchart of processing after an outage occurs in a DU of an anchor base station according to an embodiment of the present disclosure. As shown in FIG. 7, the flowchart includes steps described below.

In step 1, a terminal establishes a dual connection with the anchor base station and the offload base station. the anchor base station is a base station with a CU/DU separated architecture. The offload base station may be the CU/DU separated architecture or an integrated architecture.

In step 2, the DU of the anchor base station detects a terminal link quality outage.

In step 3, the DU of the anchor base station reports an outage message of a terminal traffic connection to the CU of the anchor base station.

In step 4, the anchor base station stops sending terminal traffic downlink data to the DU.

In step 5, the CU of the anchor base station determines, through "maximum PDCP SN submitted continuously and successfully" IE in the outage message, which PDCP PDUs are not successfully transmitted in the DU, sends the part of PDCP PDUs, through the downlink data frame, to the offload base station for transmission, and sends, through the downlink data frame, all of subsequent terminal traffic bearer data received from the core network to the offload base station for transmission.

In step 6, when the offload base station identifies, through the "retransmission data indication" field in the downlink data frame, that the data is the retransmission data, the sending priority of the data is increased, and the data is sent preferentially.

In step 7, after the DU of the anchor base station detects that the terminal traffic link quality resumes, a resume message of the terminal connection is sent to the CU.

In step 8, after the CU node of the anchor base station receives the resume message reported by the DU of the anchor base station, the anchor base station resumes sending data to the DU of the anchor base station.

In an embodiment, after step 3, in response to receiving the outage message of the terminal connection, the CU of the anchor base station may start a timer, and in response to receiving the resume message before the timer times out, the CU stops the timer. In response to failing to receive the resume message reported by the DU until the timer times out, the CU may initiate a terminal RRC connection release process to release a connection to the terminal.

Example 3

Figure 8:
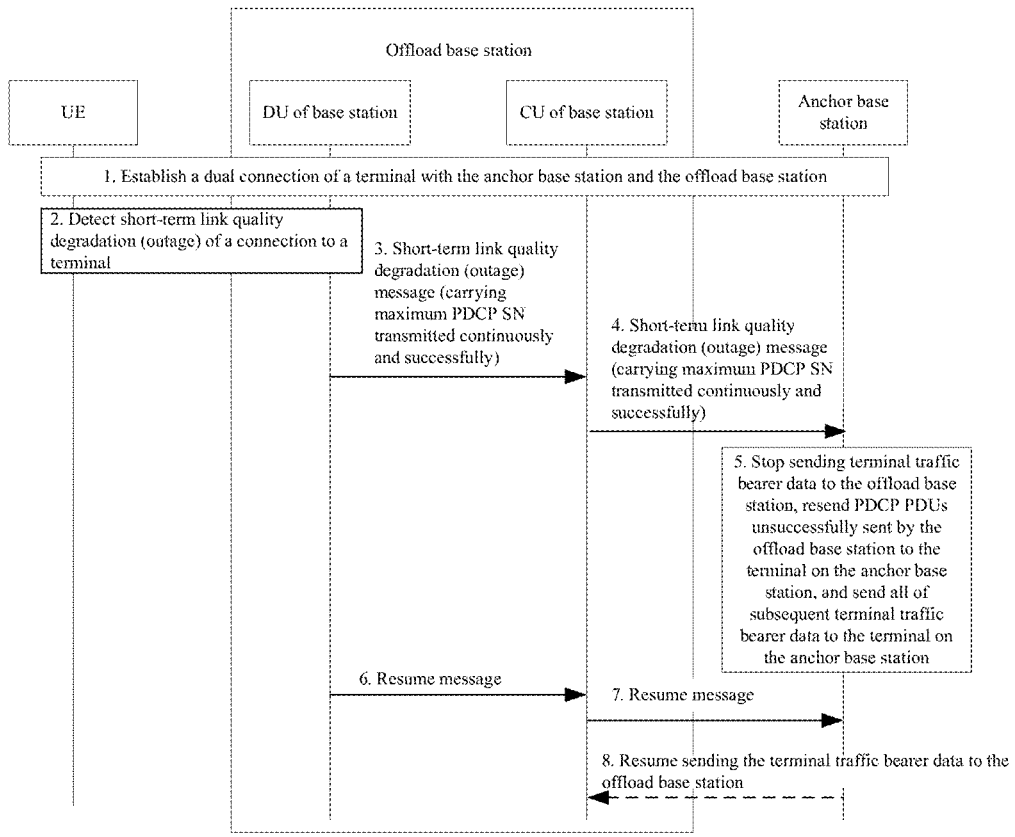
FIG. 8 is a flowchart of processing after an outage occurs in a DU of an offload base station according to an embodiment of the present disclosure.

FIG. 8 is a flowchart of processing after an outage occurs in a DU of an offload base station according to an embodiment of the present disclosure. As shown in FIG. 8, the flowchart includes steps described below.

In step 1, the terminal establishes a dual connection to the anchor base station and the offload base station. The offload base station is a base station with the CU/DU separated architecture. The anchor base station may be the CU/DU separated architecture or the integrated architecture.

In step 2, the DU of the offload base station detects the terminal link quality outage.

In step 3, the DU of the offload base station reports the outage message of the terminal traffic connection to the CU of the offload base station.

In step 4, after the CU node of the offload base station receives the outage message of the terminal traffic connection reported by the DU of the offload base station, the offload base station sends the outage message to the anchor base station, where the outage message includes "maximum PDCP SN submitted continuously and successfully" IE.

In step 5, after receiving the outage message of the terminal traffic connection sent by the offload base station, the anchor base station stops sending the terminal traffic bearer data to the offload base station. The anchor base station determines, through "maximum PDCP SN submitted continuously and successfully" IE in the outage message, which PDCP PDUs are not successfully transmitted in the DU, sends the part of PDCP PDUs to the terminal on the anchor base station, and sends all of subsequent terminal traffic bearer data received from the core network to the terminal on the anchor base station. In step 6, after the DU of the offload base station detects that the terminal traffic link quality resumes, the resume message of the terminal traffic connection is sent to the CU of the offload base station.

In step 7, after the CU of the offload base station receives the resume message of the terminal traffic connection sent by the DU of the offload base station, the offload base station sends the resume message to the anchor base station.

In step 8, after the anchor base station receives the resume message of the terminal traffic connection reported by the offload base station, the anchor base station resumes sending the terminal traffic bearer data to the offload base station.

In an embodiment, after step 4, in response to receiving the terminal traffic connection outage message sent by the offload base station, the anchor base station may start a timer, and in response to receiving the resume message of the terminal traffic connection of the offload base station before the timer times out, the anchor base station stops the timer. After the timer times out, in response to failing to receiving the resume message of the terminal traffic connection reported by the offload base station, the anchor base station may initiate modification process of a terminal traffic bearer type to modify the terminal traffic bearer type to be transmitted separately by the anchor base station, or the anchor base station may initiate an offload base station node release process.

Embodiment 3

Figure 9:
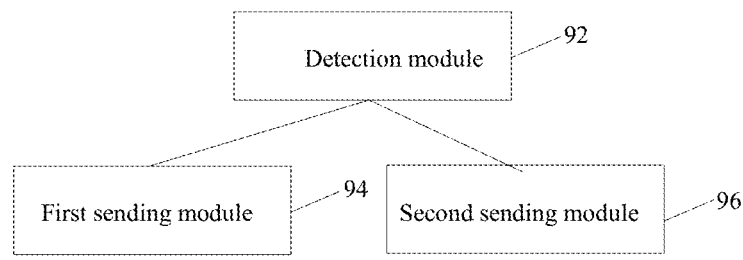
FIG. 9 is a block diagram 1 of a data transmission apparatus according to an embodiment of the present disclosure.

According to another embodiment of the present disclosure, a data transmission apparatus, applied to a source base station, is further provided. FIG. 9 is a block diagram 1 of a data transmission apparatus according to an embodiment of the present disclosure. As shown in FIG. 9, the apparatus includes a detection module 92, a first sending module 94 and a second sending module 96.

The detection module 92 is configured to detect, through a DU, link quality degradation of a connection to a terminal. The first sending module 94 is configured to determine, through a CU, data unsuccessfully transmitted by the DU, and send the data unsuccessfully transmitted by the DU via a downlink data frame to a target base station through the CU, where the downlink data frame is used for the target base station to transmit the data unsuccessfully transmitted to the terminal; or the second sending module 96 is configured to send a link quality degradation message of the source base station to the target base station, where the link quality degradation message carries a serial number of data successfully transmitted, and the link quality degradation message is used for the target base station to determine the data unsuccessfully transmitted by the DU according to the serial number, stop sending offload data to the source base station and transmit the data unsuccessfully transmitted by the DU to the terminal The functions of the detection module 92, the first sending module 94 and the second sending module 96 are implemented by a controller and a processor of a base station.

Embodiment 4

Figure 10:
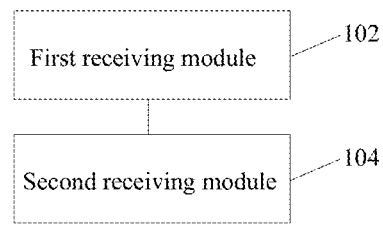
FIG. 10 is a block diagram 2 of a data transmission apparatus according to an embodiment of the present disclosure.

According to another embodiment of the present disclosure, a data transmission apparatus, applied to a target base station, is further provided. FIG. 10 is a block diagram 2 of a data transmission apparatus according to an embodiment of the present disclosure. As shown in FIG. 10, the apparatus includes a first receiving module 102 and a second receiving module 104.

The first receiving module 102 is configured to receive data unsuccessfully transmitted by a DU which is sent by a source base station through a downlink data frame, where the downlink data frame is transmitted by the source base station through a CU, and the data unsuccessfully transmitted by the DU is determined through the CU in a case where the source base station detects, through the DU, link quality degradation of a connection to a terminal through the DU, and transmit the data unsuccessfully transmitted which is carried in the downlink data frame to the terminal; or the second receiving module 104 is configured to receive a link quality degradation message of the source base station sent by the source base station, where the link quality degradation message carries a serial number of data successfully transmitted, determine the data unsuccessfully transmitted by the DU according to the serial number, stop sending offload data to the source base station and send the data unsuccessfully transmitted by the DU to the terminal.

The functions of the first receiving module 102 and the second receiving module 104 are implemented by a controller and a processor of a base station.

Embodiment 5

According to an embodiment of the present disclosure, a storage medium is further provided. The storage medium includes a stored program which, when executed, executes any one of above-mentioned methods.

In an embodiment, in the present embodiment, the storage medium above-mentioned may be configured to store program codes for performing steps described below.

In S11, a source base station detects, through a DU, link quality degradation of a connection to a terminal;

In S12, the source base station determines, through a CU, data unsuccessfully transmitted by the DU, and sends the data unsuccessfully transmitted by the DU via a downlink data frame to a target base station through the CU, where the downlink data frame is used for the target base station to transmit the data unsuccessfully transmitted to the terminal; or In S13, the source base station sends a link quality degradation message of the source base station to the target base station, where the link quality degradation message carries a serial number of data successfully transmitted, and the link quality degradation message is used for the target base station to determine the data unsuccessfully transmitted by the DU according to the serial number, stop sending offload data to the source base station and transmit the data unsuccessfully transmitted by the DU to the terminal.

In an embodiment, in the present embodiment, the storage medium above-mentioned may be configured to store program codes for performing steps described below.

In S21, a target base station receives data unsuccessfully transmitted by a DU which is sent by a source base station through a downlink data frame, where the downlink data frame is transmitted by the source base station through a CU, and the data unsuccessfully transmitted by the DU is determined through the CU in a case where the source base station detects, through the DU, link quality degradation of a connection to a terminal, and transmits the data unsuccessfully transmitted which is carried in the downlink data frame to the terminal; or In S22, the target base station receives a link quality degradation message of the source base station sent by the source base station, where the link quality degradation message carries a serial number of data successfully transmitted, determines the data unsuccessfully transmitted by the DU according to the serial number, stops sending offload data to the source base station and sends the data unsuccessfully transmitted by the DU to the terminal.

In an embodiment, in the present embodiment, the storage medium above-mentioned may include, but is not limited to, a USB flash disk, a read-only memory (ROM), a random access memory (RAM), a mobile hard disk, a magnetic disk, an optical disk or another medium capable of storing the program codes.

Embodiment 6

According to an embodiment of the present disclosure, a processor is further provided. The processor is configured to execute a program which, when executed, performs the steps of any one of above-mentioned methods.

In an embodiment, in the present embodiment, the program described above is used for performing steps described below.

In S31, a source base station detects, through a DU, link quality degradation of a connection to a terminal;

In S32, the source base station determines, through a CU, data unsuccessfully transmitted by the DU, and sends the data unsuccessfully transmitted by the DU via a downlink data frame to a target base station through the CU, where the downlink data frame is used for the target base station to transmit the data unsuccessfully transmitted to the terminal; or In S33, the source base station sends a link quality degradation message of the source base station to the target base station, where the link quality degradation message carries a serial number of data successfully transmitted, and the link quality degradation message is used for the target base station to determine the data unsuccessfully transmitted by the DU according to the serial number, stop sending offload data to the source base station and transmit the data unsuccessfully transmitted by the DU to the terminal.

In an embodiment, in the present embodiment, the program described above is further used for performing steps described below.

In S41, a target base station receives data unsuccessfully transmitted by a DU which is sent by a source base station through a downlink data frame, where the downlink data frame is transmitted by the source base station through a CU, and the data unsuccessfully transmitted by the DU is determined through the CU in a case where the source base station detects, through the DU, link quality degradation of a connection to a terminal, and transmits the data unsuccessfully transmitted which is carried in the downlink data frame to the terminal; or In S42, the target base station receives a link quality degradation message of the source base station sent by the source base station, where the link quality degradation message carries a serial number of data successfully transmitted, determines the data unsuccessfully transmitted by the DU according to the serial number, stops sending offload data to the source base station and sends the data unsuccessfully transmitted by the DU to the terminal. In an embodiment, for specific examples in the present embodiment, reference may be made to the examples described in the above-mentioned embodiments and implementation manners, and repetition will not be made in the present embodiment.

Apparently, it should be understood by those skilled in the art that each of the above-mentioned modules or steps of the present disclosure may be implemented by a general-purpose computing apparatus. The modules or steps may be concentrated on a single computing apparatus or distributed on a network composed of two computing apparatuses. In an embodiment, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or two modules or steps therein may be made into a single integrated circuit module for implementation. In this way, the present disclosure is not limited to any specific combination of hardware and software.

The above are only some embodiments of the present disclosure and are not intended to limit the present disclosure, and for those skilled in the art, the present disclosure may have various modifications and variations. Any modifications, equivalent substitutions, improvements and the like within the principle of the present disclosure shall fall within the scope of the present disclosure.

What is claimed is:

1. A data transmission method, comprising:
   detecting, by a distributed unit (DU) of an offload base station, link quality degradation of a connection to a terminal;
   sending, by the DU of the offload base station, a link quality degradation message to a centralized unit (CU) of the offload base station, wherein the link quality degradation message carries a serial number of data successfully transmitted by the DU of the offload base station; and
   sending, by the CU of the offload base station, the link quality degradation message to a CU of an anchor base station, wherein the link quality degradation message is used for the CU of the anchor base station to determine the data unsuccessfully transmitted by the DU of the offload base station according to the serial number, stop sending data to be transmitted to the offload base station and transmit the data unsuccessfully transmitted by the DU of the offload base station to the terminal, wherein the anchor base station is a CU/DU integrated architecture.

2. The method of claim 1, wherein after sending, by the offload base station, the link quality degradation message to the CU of the anchor base station, the method further comprises:
   detecting, by the DU of the offload base station, that a link of the connection to the terminal has resumed to normal;
   sending, by the DU of the offload base station to the CU of the offload base station, a resume message that the link has resumed to normal; and
   sending, by the CU of the offload base station, the resume message to the CU of the anchor base station, wherein the resume message is used for the CU of the anchor base station to resume sending the data to be transmitted to the offload base station.

3. A non-transitory computer-readable storage medium, comprising a stored program which, when executed, performs the method of claim 1.

4. A processor, which is configured to execute a program which, when executed, performs the method of claim 1.

5. A data transmission method, comprising:
   receiving, by a centralized unit (CU) of an anchor base station, a link quality degradation message from a CU of an offload base station, wherein the link quality degradation message carries a serial number of data successfully transmitted by a distributed unit (DU) of the offload base station, and the anchor base station is a CU/DU integrated architecture;

determining, by the CU of the anchor base station, the data unsuccessfully transmitted by the DU of the offload base station according to the serial number; and stopping sending, by the CU of the anchor base station, data to be transmitted to the offload base station and sending the data unsuccessfully transmitted by the DU of the offload base station to a terminal.

6. The method of claim 5, wherein after determining the data unsuccessfully transmitted by the DU of the offload base station according to the serial number, stopping sending the data to be transmitted to the offload base station and sending the data unsuccessfully transmitted by the DU of the offload base station to the terminal, the method further comprises:

receiving, by the CU of the anchor base station, a resume message from the CU of the offload base station, wherein the resume message is sent from the DU of the offload base station to the CU of the offload base station after the DU of the offload base station detects that a link connection to the terminal has resumed to normal; and resuming, by the CU of the anchor base station, sending the data to be transmitted to the offload base station according to the resume message.

7. A non-transitory computer-readable storage medium, comprising a stored program which, when executed, performs the method of claim 5.

8. A processor, which is configured to execute a program which, when executed, performs the method of claim 5.

9. A data transmission apparatus, applied to an offload base station, comprising:

a processor; and a memory for storing instructions executable by the processor;

a detection module, which is configured in a distributed unit (DU) of the offload base station and to detect link quality degradation of a connection to a terminal;

a message sending module, which is configured in the DU of the offload base station and to send a link quality degradation message to a centralized unit (CU) of the offload base station, wherein the link quality degradation message carries a serial number of data successfully transmitted by the DU of the offload base station; and a sending module, which is configured in the CU of the offload base station and to send the link quality degradation message to a CU of an anchor base station, wherein the link quality degradation message is used for the CU of the anchor base station to determine the data unsuccessfully transmitted by the DU of the offload base station according to the serial number, stop sending data to be transmitted to the offload base station and transmit the data unsuccessfully transmitted by the DU of the offload base station to the terminal, wherein the anchor base station is a CU/DU integrated architecture.

10. A data transmission apparatus, which is applied to an anchor base station, comprising:

a processor; and a memory for storing instructions executable by the processor, the processor is configured to implement the method of claim 5.

* * * * *